US008294562B2

(12) United States Patent
Gohring et al.

(10) Patent No.: US 8,294,562 B2
(45) Date of Patent: Oct. 23, 2012

(54) DISPLAY DEVICE

(75) Inventors: Markus Gohring, Nufringen (DE); Marco Fleckner, Leonberg (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 689 days.

(21) Appl. No.: 12/540,629

(22) Filed: Aug. 13, 2009

(65) Prior Publication Data

US 2010/0073156 A1 Mar. 25, 2010

(30) Foreign Application Priority Data

Sep. 25, 2008 (DE) ......................... 10 2008 049 009

(51) Int. Cl.
*B60Q 1/00* (2006.01)

(52) U.S. Cl. ..... 340/439; 340/438; 340/461; 340/691.6; 340/815.4; 701/99

(58) Field of Classification Search .................. 340/439, 340/438, 459, 461, 462, 466, 691.6, 815.4, 340/815.44, 815.45; 180/65.3, 65.8, 65.25; 123/179.16, 406.51; 73/114.31, 114.71; 701/99, 108, 123, 22; 324/115, 166; 345/33, 345/34
See application file for complete search history.

(56) References Cited

U.S. PATENT DOCUMENTS

| | | | | |
|---|---|---|---|---|
| 5,220,478 | A * | 6/1993 | Innes et al. | 361/93.2 |
| 5,592,037 | A * | 1/1997 | Sickafus | 310/40 MM |
| 2005/0109550 | A1* | 5/2005 | Buglione et al. | 180/65.2 |
| 2007/0246274 | A1* | 10/2007 | Dreibholz et al. | 180/65.2 |
| 2008/0042821 | A1* | 2/2008 | Kaya | 340/459 |

FOREIGN PATENT DOCUMENTS

| | | |
|---|---|---|
| JP | 2003-278573 | 10/2003 |
| JP | 2004-224269 | 8/2004 |
| JP | 2006-290182 | 10/2006 |
| JP | 2007-112257 | 5/2007 |

* cited by examiner

*Primary Examiner* — Anh V La
(74) *Attorney, Agent, or Firm* — Gerald E. Hespos; Michael J. Porco

(57) ABSTRACT

A display device for a motor vehicle having an internal combustion engine for at least temporarily driving the motor vehicle, and for displaying operating-time-related data of the internal combustion engine. The display device is characterized in that the operating-time-related data are provided as portions of the operation of the motor vehicle with a switched-off internal combustion engine at entities (E, E', E'', . . . ) occurring earlier on the route of the motor vehicle. The display device is configured to display these data in the manner of a histogram.

18 Claims, 2 Drawing Sheets

DISPLAY DEVICE

CROSS-REFERENCE TO RELATED APPLICATIONS

This application claims priority under 35 USC 119 to German Patent Application No. 10 2008 049 009.1 filed on Sep. 25, 2008, the entire disclosure of which is incorporated herein by reference.

BACKGROUND OF THE INVENTION

1. Field of the Invention

The invention relates to a display device.

2. Description of the Related Art

An internal combustion engine of a motor vehicle need not operate continuously. For example, the internal combustion engine in a motor vehicle with a start-stop system is switched off when the motor vehicle is stationary, such as when the motor vehicle is waiting at a red traffic light. In addition, motor vehicles can provide driveless rolling (coasting). Finally, travel powered purely by electricity is possible in hybrid vehicles, i.e. motor vehicles that have a further drive source in addition to the internal combustion engine.

JP 2004224269 discloses a display device for a motor vehicle with an internal combustion engine that drives the motor vehicle at least temporarily. A counter indicates the time during which the start-stop system of the internal combustion engine is switched off. However, the driver cannot easily interpret this counter and the driver still must relate the indicated time to travel time.

JP 2006290182 discloses a display of energy flows in a hybrid vehicle. However, only an instantaneous value is displayed in JP 2006290182.

The object of the invention is to improve further the known display device and, to make it possible for the driver to understand it intuitively.

SUMMARY OF THE INVENTION

The invention relates to a display device for a motor vehicle that displays operating-time-related data as portions of the operation of the motor vehicle with a switched-off internal combustion engine at entities occurring earlier on the route of the motor vehicle. More particularly, the display device is configured to display these data in the manner of a histogram. A chronological profile or a route-related profile can be displayed easily because the operating-time-related data are provided as entities occurring earlier on the route of the motor vehicle, i.e. as elements of a correspondingly subdivided route-related variable. The display device considers the proportional operation of the motor vehicle with the internal combustion engine switched off. Thus, interpretation is easily possible for the driver in that there is already a relationship with the travel time that has passed or with the preceding route. The data are displayed in the manner of a histogram, and hence the data easily can be understood by the driver. For example, the driver can immediately recognize a corresponding profile of his fuel saving since this profile depends directly on the frequency with which the internal combustion engine is switched off.

The display device preferably provides time intervals occurring earlier as entities on the route of the motor vehicle. This constitutes a particularly easily understandable way of displaying to the driver the portion with a switched-off internal combustion engine.

The display device preferably is designed to display time intervals of a selected magnitude. A suitable magnitude here is 5 minute intervals. These intervals permit a corresponding smoothing of the time behavior occurring earlier and therefore permits a relatively "steady" display without too many details being lost.

The display of portions of the operation of the motor vehicle with a switched-off internal combustion engine at entities preferably displays the data as route intervals occurring earlier. The route-related display preferably displays the data over route intervals of equal length and hence intuitively is understood by the driver.

An improved provision of information to the driver preferably is achieved by virtue of the fact that the display device also is designed to display an average value that is averaged over at least some of the entities occurring earlier or over the displayed entities.

The display device preferably comprises a display in the field of vision of the driver of the motor vehicle. This aspect of the invention may comprise software modifications to existing display systems so that a modified version of an existing display system can display the data as described above.

The invention will now be explained in more detail with reference to a drawing.

DETAILED DESCRIPTION OF THE PREFERRED EMBODIMENT

Figure 1:
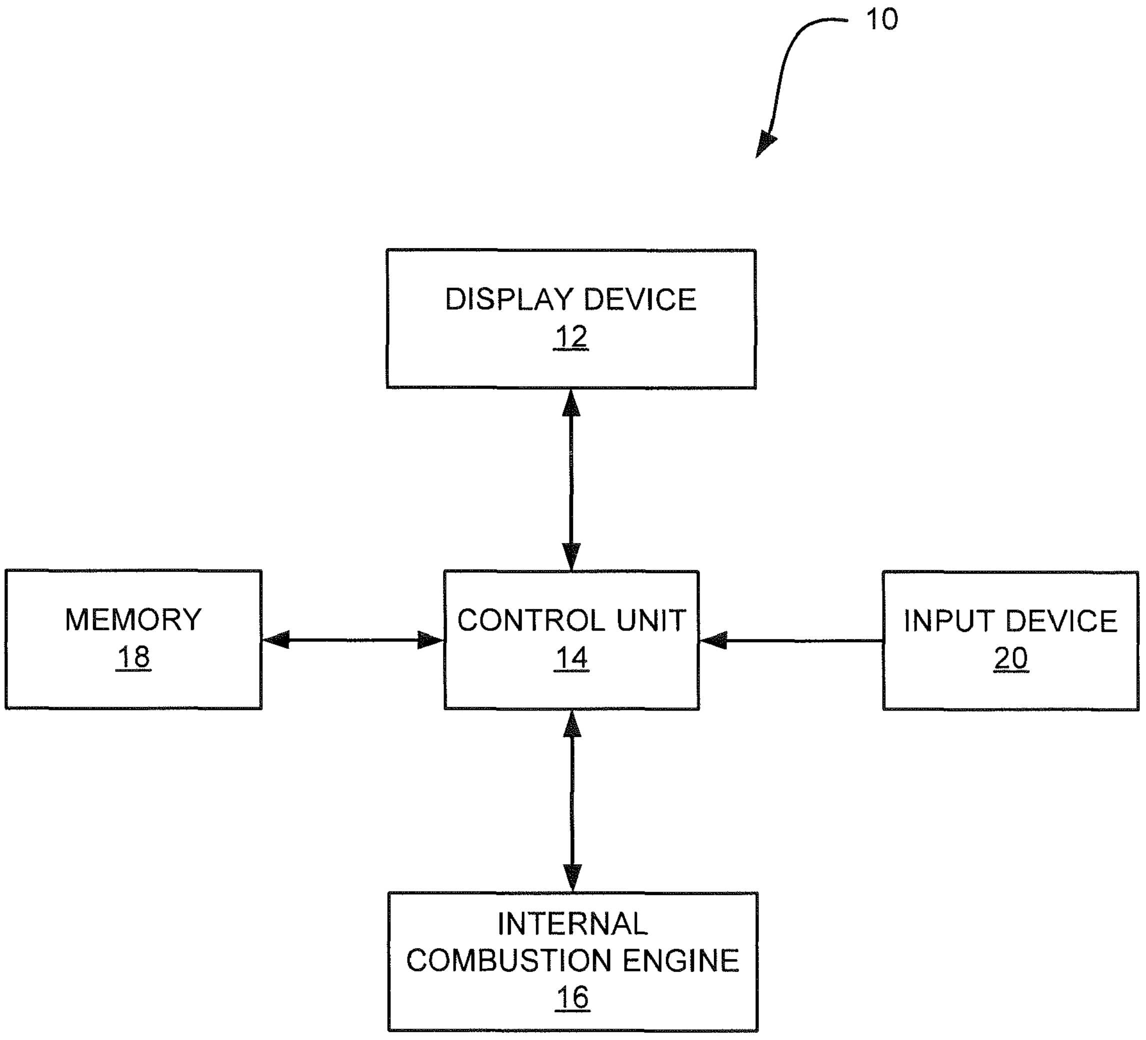
FIG. 1 is block diagram of a vehicle having at least one display device in accordance with an embodiment of the present invention.

Referring to FIG. 1, the invention relates to a motor vehicle 10 having a display device 12 that displays operating-time-related data as portions of the operation of the motor vehicle with a switched-off internal combustion engine at entities occurring earlier on the route of the motor vehicle. More particularly, the display device is configured to display these data in the manner of a histogram.

The motor vehicle 10 includes a control unit 14 for collecting operating-time-related data and generating at least one display to be provided to display device 12. The control unit 14 is coupled to an internal combustion engine 16 of the motor vehicle 10 to monitor the switched off times of the internal combustion engine 16. The control unit 14 generates the at least one display based on the monitored internal combustion engine switched off times and parameters stored in memory 18.

It will be appreciated by those skilled in the art that the block diagrams presented herein represent conceptual views of illustrative circuitry embodying the principles of the disclosure. The functions of the various elements shown in the figures may be provided through the use of dedicated hardware as well as hardware capable of executing software and/or firmware in association with appropriate software and/or firmware. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software and/or firmware, and may implicitly include, without limitation, digital signal processor ("DSP") hardware, read only memory ("ROM") for storing software, random access memory ("RAM"), and nonvolatile storage.

An input device 20, i.e., an adjustment mechanism, is provided for enabling user input to change various parameters of the display. For example, the input device 20 enables the user to selectively change the type of entities being displayed and/or selectively change the length of the entities being displayed.

It is to be appreciated that the display device 12 may be in any current form in the art, including Liquid Crystal Displays (LCD), or any other type of display currently existing or existing in the future. In one embodiment, the display device 12 is disposed in the interior compartment, i.e., dash board, of the motor vehicle 10 preferably in line of sight of the user, i.e., driver, while operating the motor vehicle 10. In another embodiment, the display device 10 is a head-up display (HUD) which projects the generated display information onto a windshield of the motor vehicle in direct line of sight of the driver. In a further embodiment, the display device 10 and input device 20 may be provided as an integral touchscreen device which displays information on a surface of the device and is further configured to receive input information via the same surface.

Figure 2:
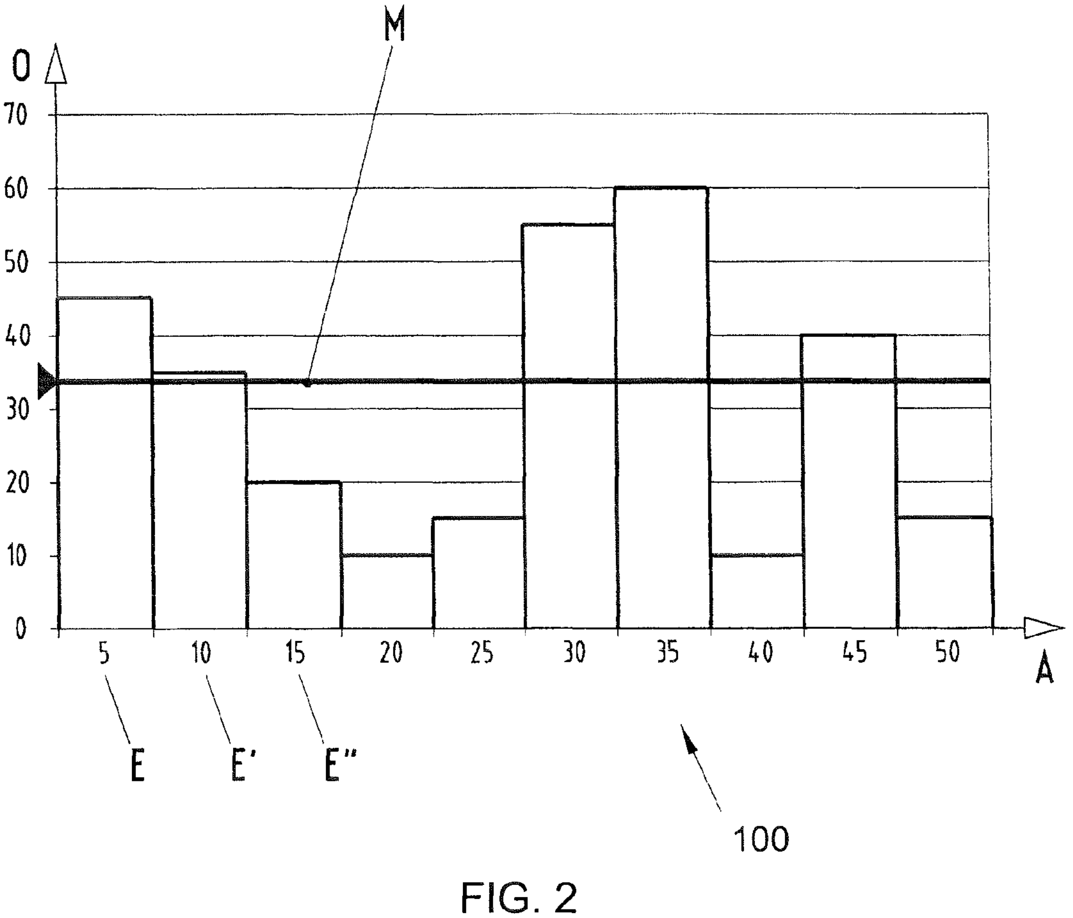
FIG. 2 is an exemplary illustration of a display device according to the present invention.

An exemplary display in accordance with the invention is identified by the numeral 100 in FIG. 2. Here, entities E, E', E", . . . occurring earlier on the route of the motor vehicle are represented on the abscissa A. In this example, the entities are embodied as 5 minute intervals occurring earlier. The first entity E to be displayed therefore is formed by the last 5 minutes (calculated back from the current time). The second entity E' to be represented is the 5 minute interval which, calculated from the current time, ends 5 minutes earlier and starts 10 minutes earlier. Further intervals are formed correspondingly. Here, the earlier the occurrence of the time intervals, calculated from the current time, the farther to the right they are displayed on the display 100.

The portion for which the motor vehicle 10 was operated with the internal combustion engine 16 switched off within any given entity is displayed on the ordinate O of the display 100 for each entity E, E', E", . . . , i.e. for each 5 minute interval in this example. In other words, in this exemplary embodiment the level of the illustrated bar corresponds to the percentage with the internal combustion engine 16 switched off within the respective 5 minute interval.

A mean value M is represented as a mean value of the operation with the internal combustion engine 16 switched off over the represented 5 minute intervals or all the 5 minute intervals of the journey being made. The type of display, for example, the number of represented 5 minute intervals, the presence of a mean value, the type and color of the bars of the histogram etc. can be set either automatically or manually by the driver via input device 20. The maximum displayed percentage, as a maximum time portion of the operation with the internal combustion engine 16 switched off corresponds in this exemplary embodiment to the level of the represented bar, and is provided at 70% in this exemplary embodiment. This value also can be provided in an adjustable form, for example manually by the driver via input device 20 or automatically as a function of the variables of the represented bars. Here, the use of a maximum value of the ordinate of less than 100% usually provides a display that can be read well.

The display 100 of a display device 12 is provided by way of example. A large number of further embodiments are possible, for example using various numbers or magnitudes (widths) of entities to be displayed as lines or three-dimensional structures, without departing from the scope of the invention.

What is claimed is:

1. A display device for a motor vehicle having an internal combustion engine for at least temporarily driving the motor vehicle, and for displaying operating-time-related data of the internal combustion engine, characterized in that:

the operating-time-related data are provided as portions of the operation of the motor vehicle with a switched-off internal combustion engine at entities occurring earlier on a route of the motor vehicle; and the display device is configured to display the data as a histogram.

2. The display device of claim 1, wherein the entities occurring earlier on the route of the motor vehicle are time intervals occurring earlier.

3. The display device of claim 2, wherein the display device is designed to display time intervals of equal magnitude.

4. The display device of claim 3, wherein the time intervals are approximately 5 minute intervals.

5. The display device of claim 1, wherein the entities are route intervals occurring earlier on the route of the motor vehicle.

6. The display device of claim 5, wherein the display device is designed to display route intervals of equal length.

7. The display device of claim 1, wherein the display device additionally is designed to display an average value (M), as a mean value over at least some of the entities.

8. The display device of claim 1, further comprising an adjustment mechanism for selectively changing the type of entities being displayed.

9. The display device of claim 1, further comprising an adjustment mechanism for selectively changing the length of entities being displayed.

10. A motor vehicle, comprising:

an internal combustion engine for at least temporarily driving the motor vehicle;

a control unit for calculating a percentage of time that the internal combustion engine is switched off during specified sequential entities of operation of the motor vehicle;

a memory for storing the percentage of time that the internal combustion engine is switched off during each of a plurality of said entities as calculated by the control unit; and a display device configured to display as a histogram the stored percentage of time that the internal combustion engine was switched off for each of a selected number of the sequential entities.

11. The motor vehicle of claim 10, wherein the entities are time intervals of equal magnitude and wherein the control unit is operative for calculating the percentage of time that the internal combustion engine is switched off during the specified sequential time intervals of equal magnitude.

12. The motor vehicle of claim 10 wherein the entities are distance intervals of equal length, and wherein the control unit is operative for calculating the percentage of time that the internal combustion engine is switched off during the specified sequential distance intervals of equal length.

13. The motor vehicle of claim 10, further comprising an input device for selectively inputting entity type information to the control unit for changing the type of entities being displayed by the display device.

14. The motor vehicle of claim 13, further comprising an input device for selectively inputting entity length information to the control unit for changing the length of each of the entities displayed by the display device.

15. A method for monitoring operation of a motor vehicle that has an internal combustion engine, the method comprising:

measuring time during which the motor vehicle is operated with the internal combustion engine switched off during the course of a selected entity;

calculating the percentage of time during which the internal combustion engine was switched off during the course of the entity;

storing in a memory the percentage of time during which the motor vehicle was operated with the internal combustion engine switched off for each of a plurality of sequential entities; and displaying as a histogram on a display device the percentage of time during which the motor vehicle was operated with the internal combustion engine switched off for each of a selected number of the sequential entities.

16. The method of claim 15, further comprising displaying a mean value of the percentage of time that the motor vehicle was operated with the internal combustion engine switched off for all of the entities displayed on the display device.

17. The method of claim 15, further comprising selecting either time or distance as the entity for which the percentage is calculated and displayed.

18. The method of claim 17, further comprising selecting a length of time or distance for the selected entity.

* * * * *